United States Patent
Goma et al.

(10) Patent No.: US 10,419,703 B2
(45) Date of Patent: Sep. 17, 2019

(54) AUTOMATIC MULTIPLE DEPTH CAMERAS SYNCHRONIZATION USING TIME SHARING

(71) Applicant: QUALCOMM Incorporated, San Diego, CA (US)

(72) Inventors: Sergiu Radu Goma, San Diego, CA (US); Kalin Mitkov Atanassov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 387 days.

(21) Appl. No.: 14/599,248

(22) Filed: Jan. 16, 2015

(65) Prior Publication Data
US 2015/0373322 A1 Dec. 24, 2015

Related U.S. Application Data

(60) Provisional application No. 62/015,358, filed on Jun. 20, 2014, provisional application No. 62/015,232, filed on Jun. 20, 2014.

(51) Int. Cl.
*H04N 5/44* (2011.01)
*H04N 5/33* (2006.01)
(Continued)

(52) U.S. Cl.
CPC .............. *H04N 5/44* (2013.01); *G01B 11/245* (2013.01); *G01B 11/2513* (2013.01);
(Continued)

(58) Field of Classification Search
CPC ........ G01S 7/4814; G01S 7/483; G01S 17/10; G01S 17/87; G01S 17/89; G03B 35/00;
(Continued)

(56) References Cited

U.S. PATENT DOCUMENTS

2002/0196438 A1* 12/2002 Kerschbaumer ........ G01J 3/513
356/320
2003/0007680 A1* 1/2003 Iijima ................ H04N 13/0022
382/154
(Continued)

FOREIGN PATENT DOCUMENTS

CN  102638692 A  8/2012
CN  102880354 A  1/2013
(Continued)

OTHER PUBLICATIONS

Faion F., et al., "Intelligent sensor-scheduling for multi-kinect-tracking", Intelligent Robots and Systems (IROS), 2012 IEEE/RSJ International Conference on, IEEE, Oct. 7, 2012 (Oct. 7, 2012), pp. 3993-3999, XP032287853.
(Continued)

Primary Examiner — Kate H Luo
(74) Attorney, Agent, or Firm — Paradice and Li LLP

(57) ABSTRACT

Aspects relate to a depth sensing system for capturing an image containing depth information of an object. In one embodiment, a depth sensing device for use in conjunction with multiple depth sensing devices for capturing an image containing depth information of an object comprises a near-infrared transmitter comprising a laser capable of producing a near infra-red light beam, a diffractive optical element positioned to receive a light beam emitted from the laser, the diffractive optical element, a collimating lens, and a near-infrared receiver coupled to the transmitter in a relative position, the receiver comprising a sensor assembly capable of producing an image of the received light, the depth sensing device being configured to transmit and receive near infra-red light beams during a time period that is different than any of the other of two or more transmitter-
(Continued)

receiver pairs of devices in communication with the depth sensing device.

27 Claims, 7 Drawing Sheets

(51) Int. Cl.

| | | |
|---|---|---|
| H04N 5/40 | (2006.01) | |
| G01B 11/245 | (2006.01) | |
| G01B 11/25 | (2006.01) | |
| G01S 17/10 | (2006.01) | |
| G01S 17/87 | (2006.01) | |
| G01S 17/89 | (2006.01) | |
| G01S 7/481 | (2006.01) | |
| G01S 7/483 | (2006.01) | |
| G03B 17/38 | (2006.01) | |
| G03B 35/00 | (2006.01) | |
| H04N 13/271 | (2018.01) | |

(52) U.S. Cl.
CPC ............ *G01S 7/483* (2013.01); *G01S 7/4814* (2013.01); *G01S 17/10* (2013.01); *G01S 17/87* (2013.01); *G01S 17/89* (2013.01); *G03B 17/38* (2013.01); *G03B 35/00* (2013.01); *H04N 5/33* (2013.01); *H04N 5/40* (2013.01); *G03B 2206/00* (2013.01); *H04N 13/271* (2018.05)

(58) Field of Classification Search
CPC ................ G03B 2206/00; G03B 17/38; H04N 2013/0096; H04N 13/0296; H04N 13/0271; H04N 13/0425; H04N 13/0447; H04N 5/33; H04N 5/40; H04N 5/44; H04N 13/0007; H04N 13/025; G01B 11/245; G01B 11/2513
USPC ......................................................... 429/144
See application file for complete search history.

(56) References Cited

U.S. PATENT DOCUMENTS

| | | | |
|---|---|---|---|
| 2005/0082480 A1 | 4/2005 | Wagner et al. | |
| 2006/0214121 A1* | 9/2006 | Schrey | G01S 7/481 |
| | | | 250/559.38 |
| 2007/0285554 A1* | 12/2007 | Givon | G03H 1/268 |
| | | | 348/340 |
| 2008/0122922 A1* | 5/2008 | Geng | G08B 13/19628 |
| | | | 348/39 |
| 2012/0081519 A1 | 4/2012 | Goma et al. | |
| 2012/0194650 A1 | 8/2012 | Izadi et al. | |
| 2012/0249740 A1* | 10/2012 | Lee | H04N 13/0207 |
| | | | 348/46 |
| 2013/0003864 A1* | 1/2013 | Sullivan | H04N 19/44 |
| | | | 375/240.25 |
| 2013/0016069 A1* | 1/2013 | Chen | G06F 3/0428 |
| | | | 345/175 |
| 2013/0095920 A1 | 4/2013 | Patiejunas et al. | |
| 2013/0101176 A1 | 4/2013 | Park et al. | |
| 2013/0175343 A1* | 7/2013 | Good | G06K 7/10564 |
| | | | 235/462.32 |
| 2013/0242058 A1* | 9/2013 | Bae | H04N 13/0271 |
| | | | 348/46 |
| 2013/0265396 A1 | 10/2013 | Surma et al. | |
| 2013/0315501 A1* | 11/2013 | Atanassov | G06T 5/001 |
| | | | 382/275 |
| 2014/0071234 A1 | 3/2014 | Millett | |
| 2014/0094307 A1* | 4/2014 | Doolittle | G06F 3/017 |
| | | | 463/36 |
| 2014/0333728 A1* | 11/2014 | Navab | G01S 7/497 |
| | | | 348/47 |
| 2015/0002734 A1* | 1/2015 | Lee | H04N 5/2256 |
| | | | 348/367 |

FOREIGN PATENT DOCUMENTS

| | | |
|---|---|---|
| EP | 2234406 A1 | 9/2010 |
| JP | 2013513179 A | 4/2013 |
| JP | 2013093847 A | 5/2013 |
| JP | 2013520751 A | 6/2013 |

OTHER PUBLICATIONS

International Search Report and Written Opinion—PCT/US2015/033695—ISA/EPO—dated Sep. 2, 2015.

* cited by examiner

AUTOMATIC MULTIPLE DEPTH CAMERAS SYNCHRONIZATION USING TIME SHARING

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application claims the benefit of U.S. Provisional Application No. 62/015,358, filed Jun. 20, 2014, entitled "ISOLATION OF MULTIPLE DEPTH CAMERAS THOUGH USING DIFFERENT CARRIER FREQUENCIES," and this application also claims the benefit of U.S. Provisional Application No. 62/015,232, filed Jun. 20, 2014, entitled "AUTOMATIC MULTIPLE DEPTH CAMERAS SYNCHRONIZATION USING TIME SHARING," the entire content of both of these provisional applications is incorporated by reference herein in its entirety and should be considered a part of this specification.

TECHNICAL FIELD

The present disclosure relates to imaging systems and methods that include depth cameras. In particular, the disclosure relates to systems and methods that enable multiple depth cameras to be used simultaneously without interference.

BACKGROUND

Active sensing can be used to determine three dimensional models. Active sensing systems include, for example, time-of-flight systems and structured light systems. In order to extract a three dimensional (3D) model of an object, multiple active sensing devices may be used. Some embodiments of a depth sensing system (also referred to as depth cameras) use an infra-red (IR) transmitter to project an invisible IR structured light pattern into the environment and onto an object. The IR radiation reflected from the object is detected by an IR sensor or camera of the depth sensing system. Objects within the environment cause distortions in the structured light pattern as seen by the camera, which is off-axis compared to the light source and these distortions can be used to resolve depth information about the scene.

A depth sensing system having a single camera has a limited field of view and provides depth information from a single viewpoint so that an object which is close to the depth camera may occlude a large portion of the environment. One solution which extends the area of the environment which can be mapped is to use more than one IR depth camera. This provides views of the scene from different perspectives and enables a 360 degree model of an object to be formed. However, in certain configurations the multiple devices used in active sensing may interfere with one another. In addition, where the structured light patterns overlap, the accuracy of each IR depth camera is degraded.

Accordingly, it would be advantageous to have depth sensing systems that overcome these issues. The embodiments described below are not limited to implementations which solve any or all of the disadvantages of known IR depth camera systems.

SUMMARY OF INVENTION

Depth sensing is typically done at lower imaging resolutions. However, the higher the number of imaging devices (light source/receiver) that are used in an imaging application, generally the better the potential quality of the reconstructed 3D model. For technologies used for depth sensing (e.g., structured light or time-of-flight (TOF)), when using multiple depth imaging devices (for example, each device including a light source (for example a laser) and an imaging device (for example, a camera)), individual depth imaging devices can interfere with each other, for example, if the cameras are all identical. In one innovation, a laser in a light source may be controlled to produce pulsed light (patterns). The durations of the pulse may be adjusted based on, for example, the laser peak power. If a particular frame rate is desired, the multiple cameras can share the time quantity of, for example, 1/frame-rate by transmitting and receiving simultaneously at a small fraction of the full frame. Images may then be produced for making a 3D model of an object without interference between the multiple depth imaging devices.

One innovation includes a depth sensing device for capturing an image containing depth information of a scene and for use in a depth sensing system that includes at least one other depth sensing device. The depth sensing device includes a transmitter capable of projecting light on a scene, the transmitter comprising a laser capable of producing a light beam including a series of laser pulses, each pulse having a pulse length and the series of pulses produced at a pulse frequency, a receiver coupled to the transmitter at a known relative orientation, the receiver comprising a shutter and a sensor assembly capable of producing an image based on sensing light projected by the transmitter and reflected from the scene. The depth sensing system further includes a controller comprising a processor, the controller coupled to the transmitter and the receiver, the controller configured to determine the presence of light in the scene using the receiver, control the pulse length of the series of laser pulses, control when an exposure window begins during which the transmitter is activated to project light on the scene and activate the receiver to begin sensing light reflected from the scene, the beginning of the exposure window and the pulse length controlled based on the determined presence of the light on the scene from the at least one other depth sensing device so the exposure window is temporally different from when any other of the at least one other depth sensing devices in the system is illuminating the scene. In one aspect, the laser is capable of producing a near infrared (NIR) light beam, the transmitter further includes an optical element positioned to receive the NIR light beam emitted from the laser, the optical element including a plurality of features configured to produce a known structured light pattern when the NIR light beam propagates through the optical element, and the controller is further configured to determine the presence of NIR light indicative of a structured light pattern in the scene using the NIR receiver. In another aspect, wherein the controller is further configured to activate the transmitter to project a structured light pattern on the scene and adjust the shutter to be synchronized with the pulse length of the NIR light beam if the controller determines there is no NIR light indicative of a structured light pattern present on the scene. In another aspect, the controller is further configured to delay the transmitter from producing a NIR light beam for a delay period if the controller determines the presence of NIR light indicative of a structured light pattern on the scene, and at the end of the delay period check again for the presence of NIR light indicative of a structured light pattern on the scene.

In another aspect, the plurality of features includes a plurality of diffractive optical features. In another aspect, transmitter comprises a time-of-flight (TOF) transmitter. In another aspect, the shutter comprises a rolling shutter, and wherein during the exposure time the controller activates the rolling shutter to scan across the scene when the scene is illuminated by light projected by the transmitter. In another aspect, the controller is configured to determine an exposure window without communicating with the at least one other device or another synchronization system. In another aspect, the controller is further configured to adjust the pulse frequency based on the determined presence of light in the scene so the that the transmitter projects light onto the scene during an exposure window that is temporally different than when any other of the at least one depth sensing device is illuminating the scene.

Another innovation includes a method operative on a depth sensing device for capturing an image containing depth information of a scene in a depth sensing system that includes at least two depth sensing devices, the method comprising detecting light reflected from a scene using a sensor, the light indicative of the scene being illuminated by a depth sensing device. If light from the scene is not detected, the method may activate a transmitter of the depth sensing device to project light on the scene during an exposure window, and activating a shutter of the depth sensing device to capture information from the reflection of the light during the exposure time, the projected light including a series of pulses having a pulse length and a pulse frequency. If light from the scene is detected, the method may adjust a shutter of the depth sensing device to a detected laser pulse length, and again sensing light from the scene. If light is again detected, the method can delay the start of an exposure window during which the transmitter of the depth sensing device projects light on the scene the shutter of the depth sensing device captures information from the reflection of the light from the scene, and iteratively repeating sensing if light is present on the scene and delaying the start of an exposure window until light is not detected. If light from the scene is not detected, the method can activate the transmitter and the receiver for the exposure window, projecting light on the scene in a series of pulses, the series of pulses having a pulse frequency and each pulse having a pulse length, and detecting light projected light from the scene using the receiver. In one aspect of the method, the transmitter produces a near infrared (NIR) light beam, the transmitter comprises an optical element positioned to receive the NIR light beam emitted from the laser, the optical element including a plurality of features configured to produce a known structured light pattern when the NIR light beam propagates through the optical element, and detecting light form the scene includes detecting the presence of NIR light indicative of a structured light pattern in the scene using the receiver. In one aspect of the method, a controller determines the exposure window without communicating with the at least one other device or another synchronization system. In another aspect, the method can adjust the pulse frequency based on the determined presence of light in the scene so that the transmitter projects light onto the scene during an exposure window that is temporally different than when any other of the at least one depth sensing device is illuminating the scene.

Another innovation includes a near-infrared (NIR) depth sensing device for capturing an image containing depth information of a scene and for use in a depth sensing system that includes at least one other depth sensing device. The depth sensing device includes a NIR transmitter capable of projecting a NIR structured light pattern on a scene, the NIR transmitter including a laser capable of producing a NIR light beam having a pulse length, and an optical element positioned to receive the NIR light beam emitted from the laser, the optical element including a plurality of features configured to produce a known structured light pattern when the NIR light beam propagates through the optical element. The depth sensing device can also include a NIR receiver coupled to the NIR transmitter at a known relative orientation, the NIR receiver comprising a shutter and a sensor assembly capable of producing an image from a sensed NIR structured light pattern in the scene, and a controller comprising a processor, the controller coupled to the NIR transmitter and the NIR receiver, the controller configured to determine the presence of NIR light using the NIR receiver, the controller further configured to determine a time to activate the NIR transmitter and illuminate the scene with the structured light pattern and to activate the shutter for an exposure time to capture information from the reflection of the structured light pattern from the scene, the time to activate the transmitter and to activate the shutter based on the determined presence of the NIR light in the scene such that the transmitter and shutter are activated during a time period that is different than when any other of the at least one other depth sensing devices in the system is illuminating the scene with NIR light. In some embodiments, the controller is further configured to activate the transmitter to project a structured light pattern and adjust the shutter to be synchronized with the pulse length of the NIR light if the controller determines there is no NIR light present in the scene. In some embodiments, the controller is further configured to delay the NIR transmitter from producing a NIR light beam for a delay period if the controller determines the presence of NIR light (indicative of a structured light pattern on the scene) and at the end of the delay period check again for the presence of NIR light indicative of a structured light pattern on the scene.

Another innovation includes a depth sensing device for capturing an image containing depth information of a scene and for use in a depth sensing system that includes at least one other depth sensing device. In some embodiments the depth sensing device includes means for projecting light on a scene, the light projecting means configured to produce a laser light beam including a series of laser pulses, each pulse having a pulse length and the series of pulses produced at a pulse frequency, and means for receiving light coupled to the projecting means at a known relative orientation, the light receiving means configured to produce an image based on detecting light projected by the light projecting means and reflected from the scene. The device may also include means for controlling coupled to the projecting means and the light receiving means, the controlling means configured to determine the presence of light in the scene using the light receiving means, and control the pulse length of the series of laser pulses, control when an exposure window begins during which the light projecting means is activated to project light on the scene and activate the light receiving means to begin sensing light reflected from the scene, the beginning of the exposure window and the pulse length controlled based on the determined presence of the light on the scene from the at least one other depth sensing device so the exposure window is temporally different from when any other of the at least one other depth sensing devices in the system is illuminating the scene.

Various other features may also be included in different implementations. In some embodiments of the depth sensing device, the light projecting means comprises a transmitter including a laser. The light receiving means may include a receiver including a shutter and a sensor assembly capable of producing an image based on sensing light projected by the light projecting means and reflected from the scene. The controlling means may include at least one processor. In various embodiments, the laser is capable of emitting a near infrared (NIR) light beam, the light projecting means comprises a transmitter comprising an optical element positioned to be illuminated by the NIR light beam emitted from the laser, the optical element including a plurality of features configured to produce a known structured light pattern when the NIR light beam propagates through the optical element, and the controlling means comprises a controller configured to determine the presence of NIR light indicative of a structured light pattern in the scene using the NIR receiver. The plurality of features may include a plurality of diffractive optical features. The transmitter may include a time-of-flight (TOF) transmitter. The controller may be further configured to activate the transmitter to project a structured light pattern on the scene and adjust the shutter to be synchronized with the pulse length of the NIR light beam if the controller determines there is no NIR light indicative of a structured light pattern present on the scene. The controller may be further configured to delay the transmitter from producing a NIR light beam for a delay period if the controller determines the presence of NIR light indicative of a structured light pattern on the scene, and at the end of the delay period check again for the presence of NIR light indicative of a structured light pattern on the scene. The means for receiving may include a rolling shutter, and during the exposure time the controller activates the rolling shutter to scan across the scene when the scene is illuminated by light projected by the transmitter. The controlling means may be configured to determine an exposure window without communicating with the at least one other device or another synchronization system. The controller may be further configured to adjust the pulse frequency based on the determined presence of light in the scene so the that the transmitter projects light onto the scene during an exposure window that is temporally different than when any other of the at least one depth sensing device is illuminating the scene.

Another innovation includes a computer readable medium containing non-transient instructions that control at least one processor to execute the instructions, the method including detecting light reflected from a scene using a sensor, the light indicative of the scene being illuminated by a depth sensing device, if light from the scene is not detected, activating a transmitter of the depth sensing device to project light on the scene during an exposure window, and activating a shutter of the depth sensing device to capture information from the reflection of the light during the exposure time, the projected light including a series of pulses having a pulse length and a pulse frequency, if light from the scene is detected, adjusting a shutter of the depth sensing device to a detected laser pulse length, and again sensing light from the scene, if light is again detected, delaying the start of an exposure window during which the transmitter of the depth sensing device projects light on the scene the shutter of the depth sensing device captures information from the reflection of the light from the scene, and iteratively repeating sensing if light is present on the scene and delaying the start of an exposure window until light is not detected, and if light from the scene is not detected, activating the transmitter and the receiver for the exposure window, projecting light on the scene in a series of pulses, the series of pulses having a pulse frequency and each pulse having a pulse length, and detecting light projected light from the scene using the receiver. In some embodiments where the transmitter produces a near infrared (NIR) light beam the transmitter comprises an optical element positioned to receive the NIR light beam emitted from the laser, the optical element including a plurality of features configured to produce a known structured light pattern when the NIR light beam propagates through the optical element, and detecting light from the scene comprises detecting the presence of NIR light indicative of a structured light pattern in the scene using the receiver.

BRIEF DESCRIPTION OF THE DRAWINGS

The disclosed aspects will hereinafter be described in conjunction with the appended drawings and appendices, provided to illustrate and not to limit the disclosed aspects, wherein like designations denote like elements.

DETAILED DESCRIPTION

Figure 1:
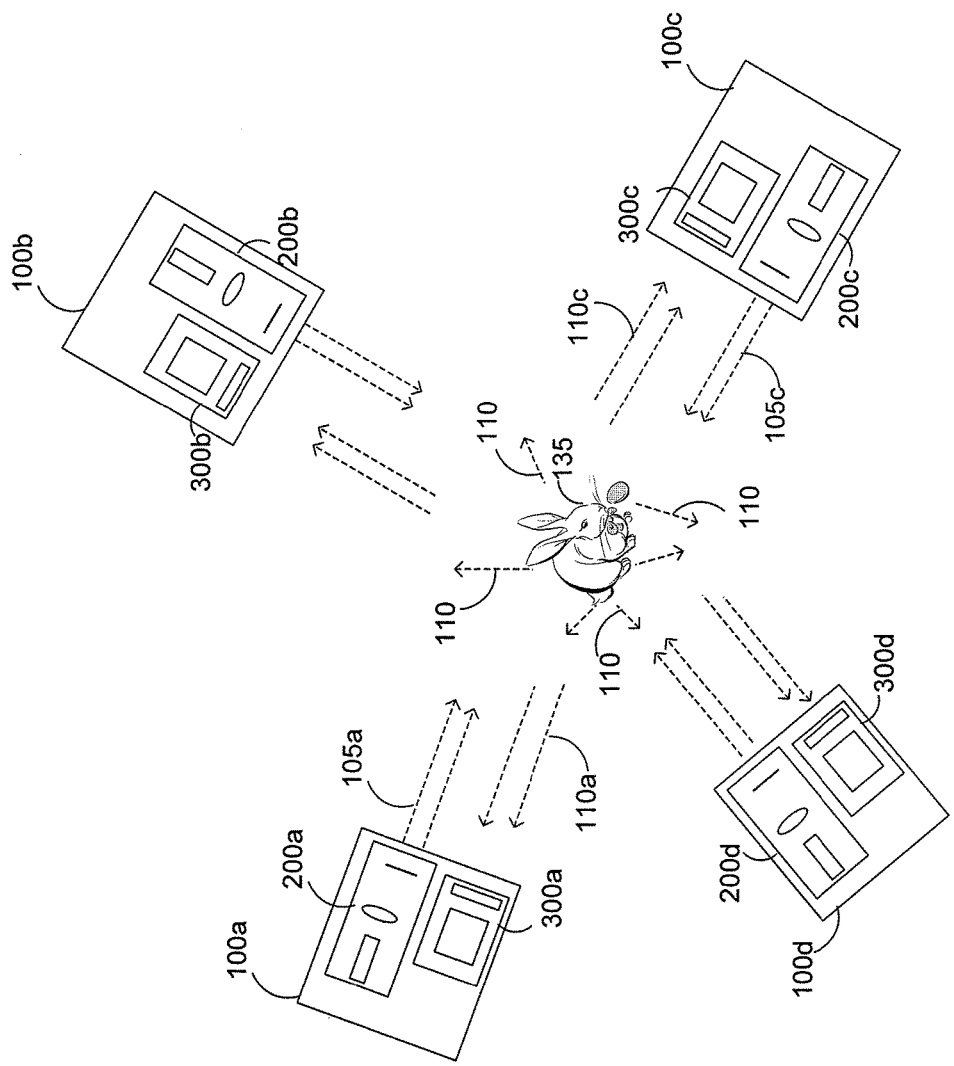
FIG. 1 is a diagram illustrating an example of a system that includes multiple systems for active light sensing to sense the depth, for example, the three-dimensional (3D) topography, of an object.

In the following description, specific details are given to provide a thorough understanding of the examples. However, the examples may be practiced without these specific details, and may include more features or less features that the described examples while remaining in the scope of the embodiments described and claimed herein.

Implementations disclosed herein provide systems, methods and apparatus for generating images that can be used to form a 3D model of an object. Using active sensing for generating such images has become very common in the last couple of years. In order to extract an object 3D model, multiple active sensing devices/systems have been used, for example, in an arrangement that surrounds an object or scene such that images produced by the multiple active sensing devices, in summation, include depth information of the entire scene or object. To determine a 3D model of an object, multiple images having different viewpoints of the object are collected. Post-processing of the multiple images can produce the 3D model. The post-processing may be near-real time if fast enough computers and techniques are employed for the post processing of the multiple images. Because depth sensing imaging may be done at relatively lower resolution, the higher the number of devices that are used to produce images with depth information, the better the quality of the reconstructed 3D model that is made using the images. Accordingly, it can be desirable to use multiple imaging systems.

Examples of active (depth) sensing systems include, but are not limited to, structured light systems and time-of-flight (TOF) systems. Structured-light 3D imaging systems (sometimes referred to herein as "cameras") may project a pattern of light on an object and look at the deformation of the pattern on the object. That is, they include a projection component (or a transmitter) and a receiver component. A pattern is projected onto the object using a stable light source. An imaging system (for example, a camera) offset slightly from the pattern projector and having knowledge of the pattern, receives light from the projected pattern and determines from the shape of the pattern the distance of points in the field of view. A TOF system (or camera) is a range imaging system that resolves distance based on the known speed of light, measuring the time of flight of a light signal between the camera and scene/object, and back to the camera, for points of the image. Various TOF systems may use ultraviolet, visible, or near infrared (NIR) light to illuminate a scene or object, and it can be used with a wide variety of materials. The transmissions of the individual depth cameras may interfere with each other.

For efficiency, it can be advantageous to collect the multiple images simultaneously. However, regardless of whether the technology for depth sensing is structured light, TOF, or another technology, using multiple transmitters can cause interference between the systems, causing aberrations in images produced by the cameras, because each system is emitting light that another system may receive. In some systems, a laser light source used to produce a pattern of light is emitting constantly. As described below, in systems that use multiple transmitter/receiver pairs, each depth sensing system (for example, a transmitter/receiver pair) may be configured such that the laser is pulsed and the duration of the pulse can be adjusted (for example, based on the laser peak power) such that the multiple transmitter/receiver pairs have different light pulse/camera exposure times. If a particular frame rate is desired, the multiple cameras can share the time quant of 1/frame_rate as illustrated below (for this particular example global shutter cameras are considered). A light source of the depth sensing system (the light sources collectively referred to as a "laser") may be emitting light constantly when it is actuated. In some embodiments, the laser may be controlled to emit pulses of light of a certain width and at a certain time. The camera exposure window may be correspondingly controlled to receive radiation during the period of the laser pulse. As described in more detail below, when multiple depth sensing systems are used together, the pulses of the lasers in each depth sensing system can be controlled to produce pulses at different times. The associated camera in each depth sensing system can be correspondingly controller controlled to have an exposure window during the laser pulse time.

Some of the advantages of embodiments described herein include that the same type of device can be used for single and multiple depth camera device sensing, no changes in device hardware (for example, camera or transmitter), easy to implement transmitter-camera synchronization, user transparent inter-camera synchronization, and an arbitrary number of cameras can be added. In some embodiments that use multiple transmitter/receiver pairs to collect depth information of an object, each transmitter/receiver pair may be configured to project a pattern and receive light of a different carrier frequency, which will minimalize or prevent interference between the cameras.

FIG. 1 is a diagram illustrating an example of a system that includes multiple systems for active light sensing to sense the depth, for example, the three-dimensional (3D) topography, of a scene that includes one or more objects. In the embodiment illustrated in FIG. 1, the system includes four depth sensing systems (for example, transmitter 100a-d/receiver 200a-d systems) pointed towards the object 135 to illuminate the object 135 with IR radiation from different viewpoints, for example, to surround an object of interest (object) 135 and illuminate and receive light from all surfaces of an object 135. In some embodiments, more than four transmitter/receiver pairs may be used, or fewer may be used. For example, depth sensing system 100a provides structured light 105a to illuminate the object 135 and then detects (reflected) structured light 110 reflected from the object 135. In some embodiments, more than four transmitter/receiver pairs may be used, or fewer may be used. In this embodiment, each depth sensing system (or camera) 100a-d includes a structured light transmitter 200. An example of the transmitter 200 is further described in reference to FIG. 2. Each depth sensing system 100a-d may also include a receiver 300. An example of the receiver 300 is further described in reference to FIG. 3.

Various depth sensing systems may be used. Each of the depth sensing devices in the arrangement may include a structured light transmitter, a time-of-flight (TOF) transmitter, or another illumination source. In various embodiments, the illumination source of each depth sensing device may be configured to produce ultraviolet, visible, or infra-red (IR) or near infrared (NIR) illumination. In some embodiments, each depth sensing system 100a-d may include a laser that produces a near-infra red (NIR) light beam that is optically manipulated to produce a light pattern, and the light pattern is projected on the object 135. Generally, near infra-red light is light that is above 700 nanometers to about 1 mm. The depth sensing system 100 may be configured to produce a NIR beam in a very narrow spectrum of wavelengths, for example, within a narrow range of about 1-5 nanometers of wavelengths. In some embodiments, each of the transmitter/receiver systems projects and receives a different NIR carrier frequency (or very narrow range of NIR carrier frequencies) such that the multiple devices do not interfere with each other. In each configuration each of the paired devices may transmit and receive a different NIR carrier frequency.

An advantage of the above described system includes simpler design of multiple depth camera systems. Negligible (or no) interference can be achieved by these embodiments. Also, with such systems it is relatively easy to control interference verses noise by manipulating the bandwidth of the band pass filter. In addition, scaling the system to design systems with N cameras is straight-forward, only needing to define different carrier frequencies. In some embodiments, both the transmitter and the receiver are tunable, and in such systems the transmitters and receivers can all be designed the same which can lower cost and allow for easier maintenance and repair.

The depth sensing system 100 may include a controller that controls the laser to emit pulses of light according to certain timing criteria, to emit light of a certain pulse width and/or a certain frequency. In addition, the transmitter can include a communication module that may include a processor. The communication module (for example, the processor) may be configured to communicate information with other devices to coordinate the length of a pulse width, the frequency of the pulse width, and when to emit the pulse of light. Such components of a depth sensing system 100, and other components, are further described in reference to FIG. 2 (transmitter) and FIG. 3 (receiver).

Figure 2:
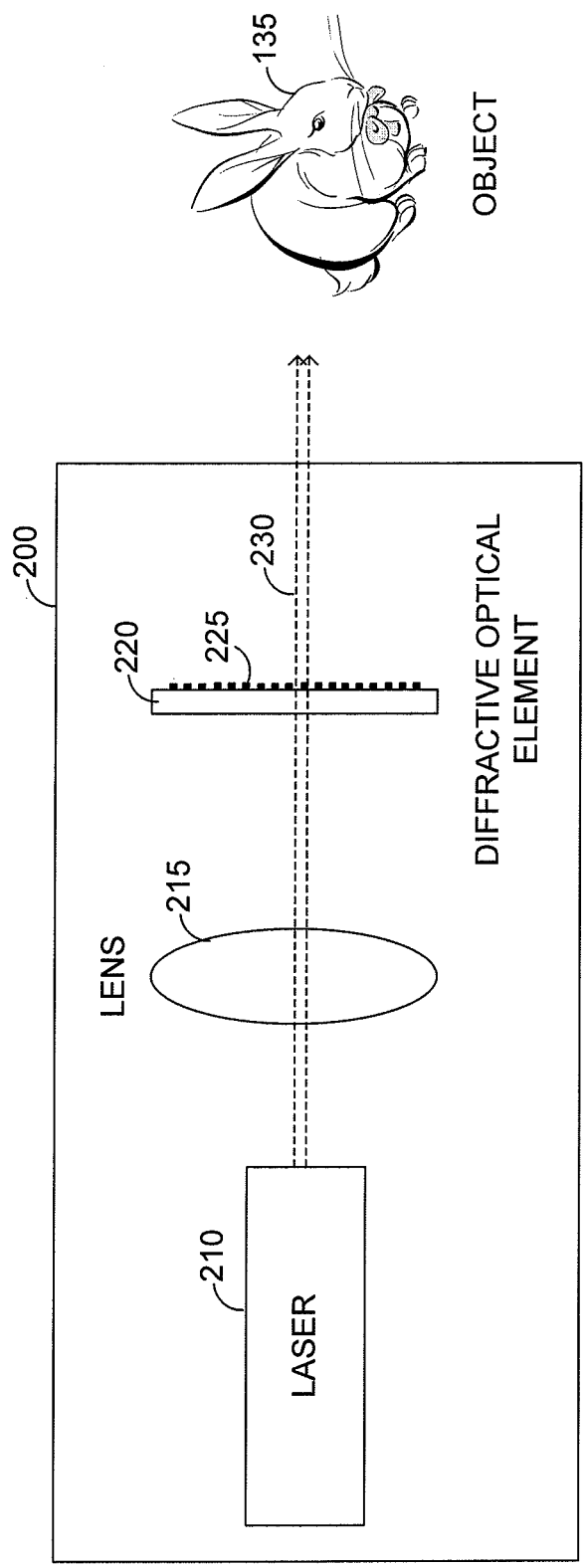
FIG. 2 is a diagram illustrating an example of a structured light transmitter, which may be, for example, the structured light transmitter illustrated in FIG. 1.

FIG. 2 is a diagram illustrating an example of a structured light transmitter 200, which may be, for example, the structured light transmitter illustrated in FIG. 1. The structured light transmitter 200 may be contained within a housing of the depth sensing system 100, as illustrated in the embodiment in FIG. 1. In some embodiments, the structured light transmitter 200 is housed with a receiver 300 in the depth sensing system. In some embodiments, the structured light transmitter 200 and the receiver 300 are housed separately but are positioned close together to perform the same functionality as a depth sensing system in which they are housed together.

The transmitter 200 includes a laser 210 that produces radiation having a narrow wavelength. In this example, the laser 210 produces near-infra red (NIR) light beam 130. The transmitter 200 also includes a collimating lens 215 and a diffractive optical element (or mask) 220 aligned such that the light beam 230 passes through the collimating lens 215 and then through the diffractive optical element 220. Diffractive features 225 on the diffractive optical element 220 produce a light pattern that is projected onto an object 135.

Figure 3:
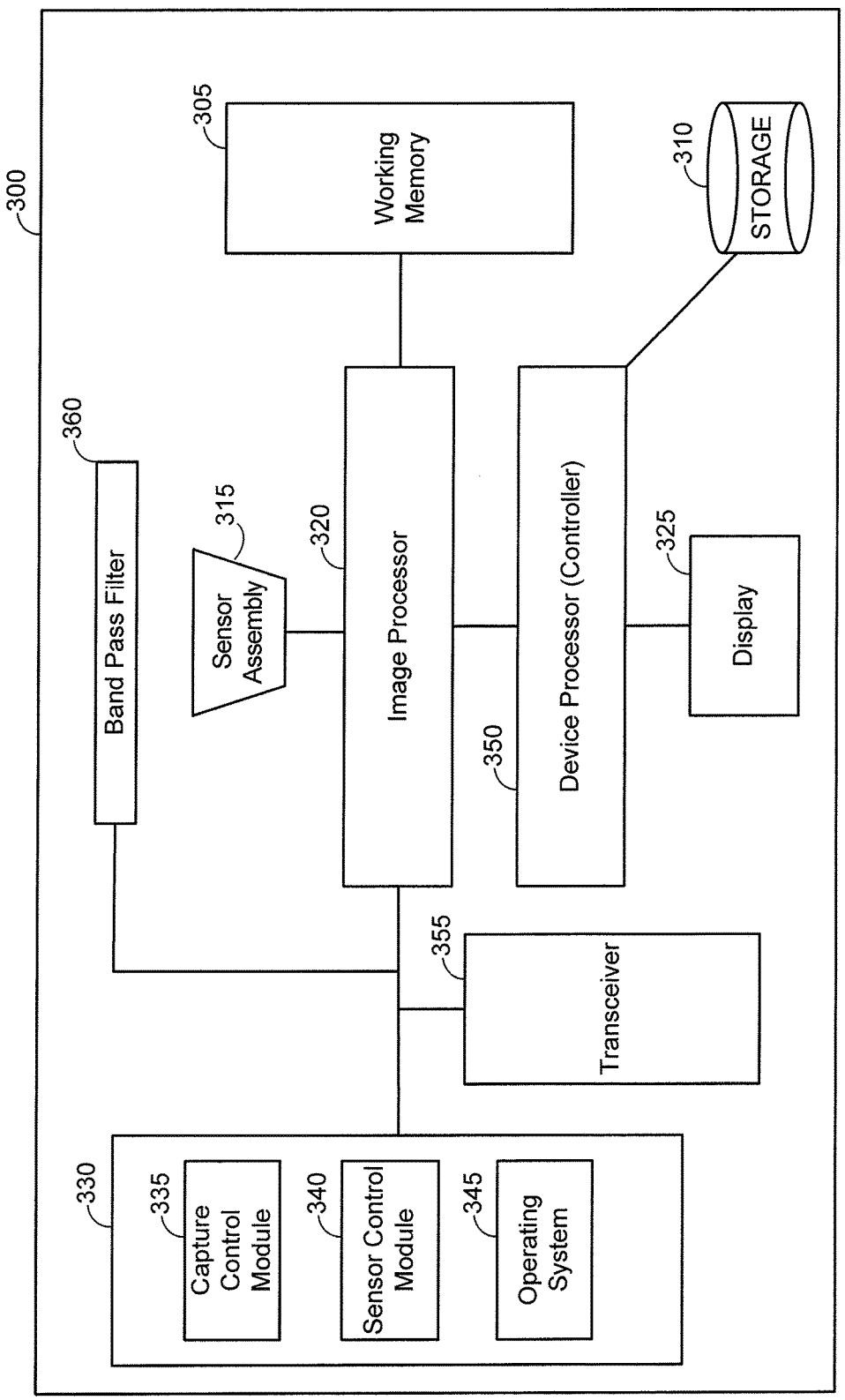
FIG. 3 is a diagram illustrating an example of a camera, which may also be referred to as a "radiation receiver" a "sensor" or simply a "receiver."

FIG. 3 is a diagram illustrating an example of a camera 300 (or a receiver), according to some embodiments. The receiver 300 may be housed with a transmitter (for example, transmitter 200 FIG. 2) in a depth sensing device. In some embodiments, one or more of the components described in reference to FIG. 3 can be coupled to and control functionality of a transmitter, for example, the length of a laser pulse generated by the transmitter, when to emit a laser pulse from the transmitter, or the frequency to emit a laser pulse from the transmitter. In some embodiments, device 300 may be a sensing device purposely configured for structured light depth sensing. In some other embodiments, device 300 may be configured as a time of flight (TOF) system. Various embodiments may have additional components or less than the components illustrated in FIG. 3, or different components.

FIG. 3 depicts a high-level block diagram of a device 300 (image capture device) having a set of components including an image processor 320 linked to an image sensor assembly 315, and a transceiver 355. The image processor 320 is also in communication with a working memory 305, memory 330, and device processor 350, which in turn is in communication with storage 310 and electronic display 325. In some embodiments, device 300 may be a cell phone, digital camera, tablet computer, personal digital assistant, or a high-end camera or imaging systems specifically made for depth sensing. Device 300 may include applications for traditional photographic and video applications, high dynamic range imaging, panoramic photo and video, or stereoscopic imaging such as 3D images or 3D video.

In the example illustrated in FIG. 3, the image capture device 300 includes the image sensor assembly 315 for capturing external images. The image sensor assembly 315 may include a sensor, lens assembly, and a primary and secondary reflective or refractive surface for redirecting a portion of a target image to each sensor. Some embodiments may have more than one sensor. The image sensor assembly may be coupled to the image processor 320 to transmit captured image to the image processor.

The image processor 320 may be configured to perform various processing operations on received image data comprising all or portions of a scene where the image data includes depth information. Image processor 320 may be a general purpose processing unit or a processor specially designed for imaging applications. Examples of image processing operations include cropping, scaling (e.g., to a different resolution), image stitching, image format conversion, color interpolation, color processing, image filtering (for example, spatial image filtering), lens artifact or defect correction, etc. Image processor 320 may, in some embodiments, comprise a plurality of processors. Certain embodiments may have a processor dedicated to each image sensor. Image processor 320 may be one or more dedicated image signal processors (ISPs) or a software implementation of a processor.

As shown in the example in FIG. 3, the image processor 320 is connected to a memory 330 and a working memory 305. In the illustrated embodiment, the memory 330 stores capture control module 335, sensor module 340, and operating system 345. These modules include instructions that configure the image processor 320 of device processor 350 to perform various image processing for determining depth information from one or more images, and device management tasks. Working memory 305 may be used by image processor 320 to store a working set of processor instructions contained in the modules of memory 330. Alternatively, working memory 305 may also be used by the image processor 320 to store dynamic data created during the operation of device 300.

Device 300 may also include a band pass filter 360 that is tuned (or configured) to allow a certain carrier frequency to pass, for example, a carrier frequency produced by the transmitter 100 of FIG. 1. In some embodiments, the band pass filter may be tunable and controlled, for example, by the capture control module 335, to allow one of several frequencies to pass through to the sensor assembly 315. This would allow the device 300 to be tuned to a carrier frequency that corresponds to the frequency used by a transmitter, which would facilitate multiple imaging system applications where each transmitter/image capture device (receiver) pair projects and receives a different carrier frequency of NIR light.

As mentioned above, the image processor 320 is configured by several modules stored in the memories. The capture control module 335 may include instructions that configure the image processor 320 to adjust the focus position of imaging sensor assembly 315. Capture control module 335 may further include instructions that control the overall image capture functions of the device 300 including functions related to capturing images having depth information. For example, capture control module 335 may include instructions that control a shutter of the sensor assembly to increase or decrease exposure time, or adjust the start or end time of an exposure window. The capture module 335, alone or collectively with the sensor control module 340, may call subroutines to configure the image processor 320 to capture depth sensing images of a scene using the sensor assembly 315. Capture control module 335 may also include functionality to control a transmitter of a depth sensing device. Capture control module 335 may also control the sensor assembly to capture an image, for example, in coordination with the transmitter emitting laser pulse and in coordination with other image capture devices.

Sensor control module 340 may comprise instructions that configure the image processor 320 to perform stitching and cropping techniques on captured image data. Target image generation may occur through known image stitching techniques.

Operating system module 345 configures the image processor 320 to manage the working memory 305 and the processing resources of device 300. For example, operating system module 345 may include device drivers to manage hardware resources such as the imaging sensor assembly 315. Therefore, in some embodiments, instructions contained in the image processing modules discussed above may not interact with these hardware resources directly, but instead interact through standard subroutines or APIs located in operating system component 370. Instructions within operating system 345 may then interact directly with these hardware components. Operating system module 345 may further configure the image processor 320 to share information with device processor 350.

Device processor 350 may be configured to control the display 325 to display the captured image, or a preview of the captured image, to a user. The display 325 may be external to the imaging device 300 or may be part of the imaging device 300. The display 325 may also be configured to provide a view finder displaying a preview image for a use prior to capturing an image, or may be configured to display a captured image stored in memory or recently captured by the user. The display 325 may comprise an LCD or LED screen, and may implement touch sensitive technologies.

Device processor 350 may write data to storage module 310, for example data representing captured images. While storage module 310 is represented graphically as a traditional disk device, those with skill in the art would understand that the storage module 310 may be configured as any storage media device. For example, the storage module 310 may include a disk drive, such as a floppy disk drive, hard disk drive, optical disk drive or magneto-optical disk drive, or a solid state memory such as a FLASH memory, RAM, ROM, and/or EEPROM. The storage module 310 can also include multiple memory units, and any one of the memory units may be configured to be within the image capture device 300, or may be external to the image capture device 300. For example, the storage module 310 may include a ROM memory containing system program instructions stored within the image capture device 300. The storage module 310 may also include memory cards or high speed memories configured to store captured images which may be removable from the camera. Transceiver 355 can be configured to communicate information with other image capture devices to determine each device should capture an image.

Although FIG. 3 depicts a device having separate components to include a processor, imaging sensor, and memory, one skilled in the art would recognize that these separate components may be combined in a variety of ways to achieve particular design objectives. For example, in an alternative embodiment, the memory components may be combined with processor components to save cost and improve performance.

Additionally, although FIG. 3 illustrates two memory components, including memory component 330 comprising several modules and a separate memory 305 comprising a working memory, one with skill in the art would recognize several embodiments utilizing different memory architectures. For example, a design may utilize ROM or static RAM memory for the storage of processor instructions implementing the modules contained in memory 330. The processor instructions may be loaded into RAM to facilitate execution by the image processor 320. For example, working memory 305 may comprise RAM memory, with instructions loaded into working memory 305 before execution by the processor 320.

Figure 4:
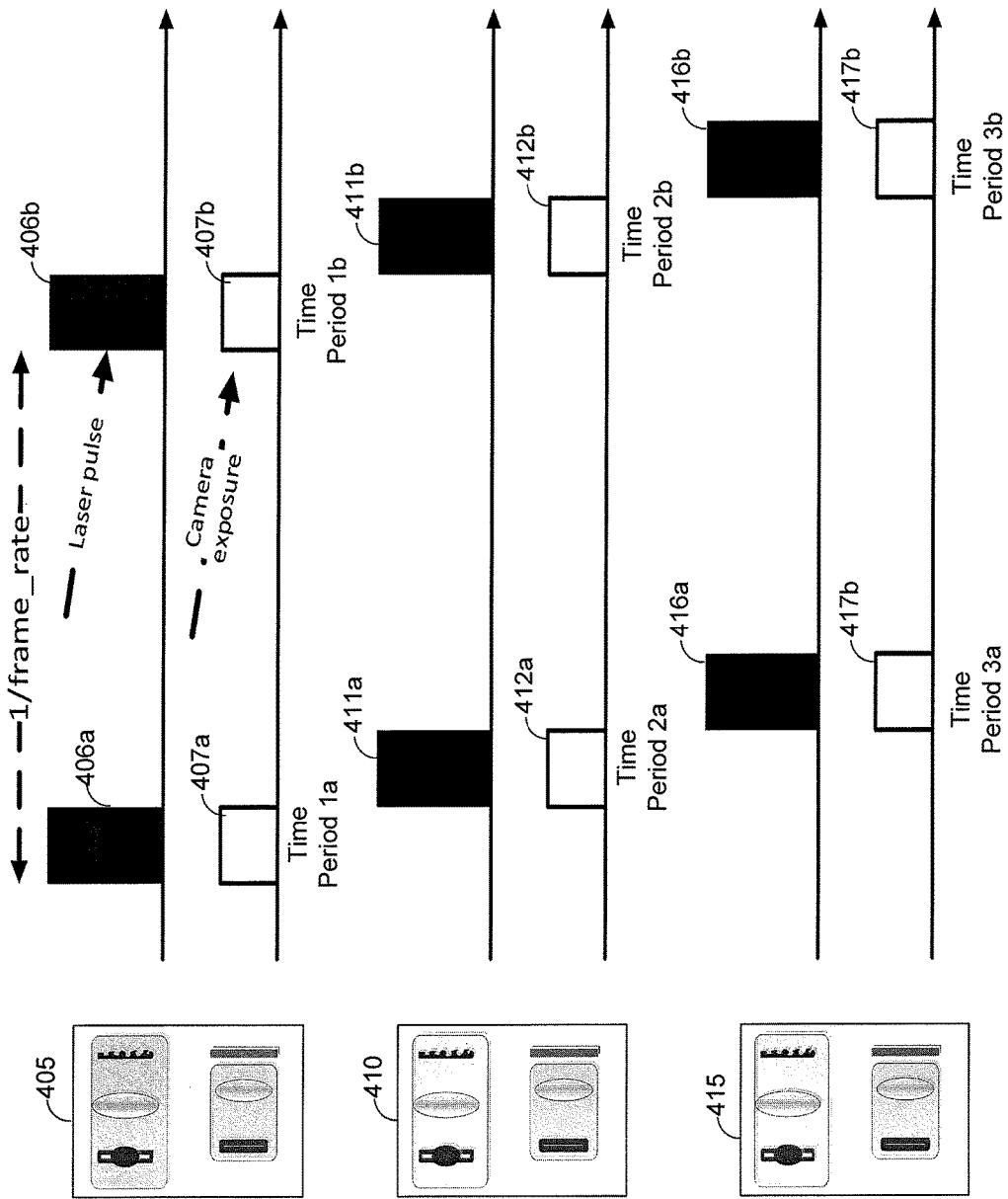
FIG. 4 is a diagram illustrating an example of three light-source/camera imaging devices that are each configured to have a pulsed light output and a camera exposure window (for example, a duration of time for exposing a sensor to radiation), the pulsed light output and camera exposure windows of each device occurring at a different time than the pulse light output and camera exposure window of the other devices.

FIG. 4 is a diagram illustrating an example of three light-source/camera imaging devices (depth sensing systems) 405, 410 and 415 that are each configured to have a pulsed light output (for example, 406a, 411a, and 416a respectively) and an exposure window (for example, 407a, 412a, and 417a respectively). The pulsed light output may be generally defined as a duration of time when a laser pulse occurs that illuminates a scene. The exposure window may be generally defined as a duration of time for exposing a sensor in the imaging device to a scene to sense radiation from the scene. FIG. 4 illustrates an example where the pulsed light outputs 406a, 411a and 416a for each imaging device occur at a different time than the other devices. FIG. 4 also illustrates the exposure windows 407a, 412a and 417a for each imaging device occur at a different time than the other imaging devices.

For example, FIG. 4 illustrates three depth sensing systems 405, 410 and 415 and illustrates an embodiment where different depth sensing systems produce a laser pulse and have a corresponding camera exposure time that is different for each system. Depth sensing system 405 produces a laser pulse 406a, 406b for a pulse width time period 1a, 1b, . . . and a corresponding same (or nearly so) camera time period (exposure window) 407a, 407b time period when an image is acquired. Depth sensing system 410 produces a laser pulse 411a, 411b or a pulse width time period 2a, 2b, . . . and a corresponding same (or nearly so) camera time period (exposure window) 412a, 412b when an image is acquired (e.g., camera exposure). Depth sensing system 415 produces a laser pulse 416a, 416b or a pulse width time period 3a, 3b, . . . and a corresponding same (or nearly so) camera time period (exposure window) 417a, 417b when an image is acquired.

In some embodiments of imaging devices, the laser may be emitting constantly, or at a particular frame rate. To prevent interference between the imaging devices, the laser may be operated to produce a periodic or a non-periodic laser pulse of a certain frame rate, and the duration of the laser pulse may be adjusted. If a particular frame rate for illuminating the scene is desired for all of the depth sensing devices, the multiple imaging devices can share the time of 1/frame-rate. For example, if there are four depth sensing devices in an arrangement to image a scene (or object) and the frame rate of each depth sensing device is one (1) frame per second, each of the depth sensing devices may produce a pulse length of ¼ second and still achieve the desired one (1) frame per second. In this example, a depth sensing device is configured to delay the start of their pulse illumination emissions based on iterative detection that the scene is being illuminated by another device, and can self-coordinate (that is, without communication with the other depth sensing devices) to determine a time to produce a laser pulse of ¼ second and have a corresponding exposure window that achieves the desired one (1) frame per second frame rate. Such processes may be implemented for configurations having imaging devices with global shutters (as illustrated in FIG. 4) or rolling shutters (as illustrated in FIG. 5).

Accordingly, in various embodiments, multiple cameras can share the total exposure time that is available without interfering with each other. For example, in some embodiments a depth sensing system may be configured to sense when the scene is not being illuminated by a light source (for example, from one of the other depth sensing systems) that will cause interference with its own depth sensing, and if not, illuminate the system (for example, using structured light or TOF technology) and sense the projected radiation. If the depth sensing system detects that the scene includes light that may interfere with its own depth sensing process, the depth sensing system can delay projecting its illumination, and then proceed to again sense if the scene includes light that may interfere with its own depth sensing process. This may be repeated until the depth sensing system determines that the scene does not include light that will interfere with its depth sensing process, and then proceed to illuminate the scene and sense the projected radiation. In some examples, the delay is for a certain delay period, which may or may not be predetermined. Having a consistent delay period may facilitate easier resolution of interferences of multiple devices. For example, as illustrated in FIG. 4, depth sensing systems 405 is consistently producing an illumination pulse at a certain frame rate during time period $1a$, $2a$ etc. If depth sensing system 410 delays to avoid a first laser pulse 406$a$ and then illuminates at the same frame rate as depth sensing system 405 during time period 2$a$, its subsequent pulse 411$b$ will illuminate the scene during time period 2$b$, avoiding the laser pulse 406$b$ produced during time period 1$b$. Such a delay process may also be performed by depth sensing system 415, and any other additional depth sensing system involved in imaging the scene. In this way, multiple depth sensing devices may, coordinate their illumination/sensing of the scene with other devices without any communication occurring between the devices, or without such coordination being directed by another controlling device for example, a network device in communication with each depth sensing system to control when they each image the scene.

In other examples, multiple delays of different duration may be used, and which may or may not be predetermined. For example, using different multiple delays with durations may prevent interference of two systems that are attempting to both proceed with a depth sensing action at the same of similar frame rate and which have the same or similar starting time. In some example, the delay is dynamically determined, for example, it may be randomly determined to try to avoid repetitive interferences. The delay durations may be completely determined by each imaging system on its own without communication between the multiple depth sensing systems in one arrangement.

Figure 5:
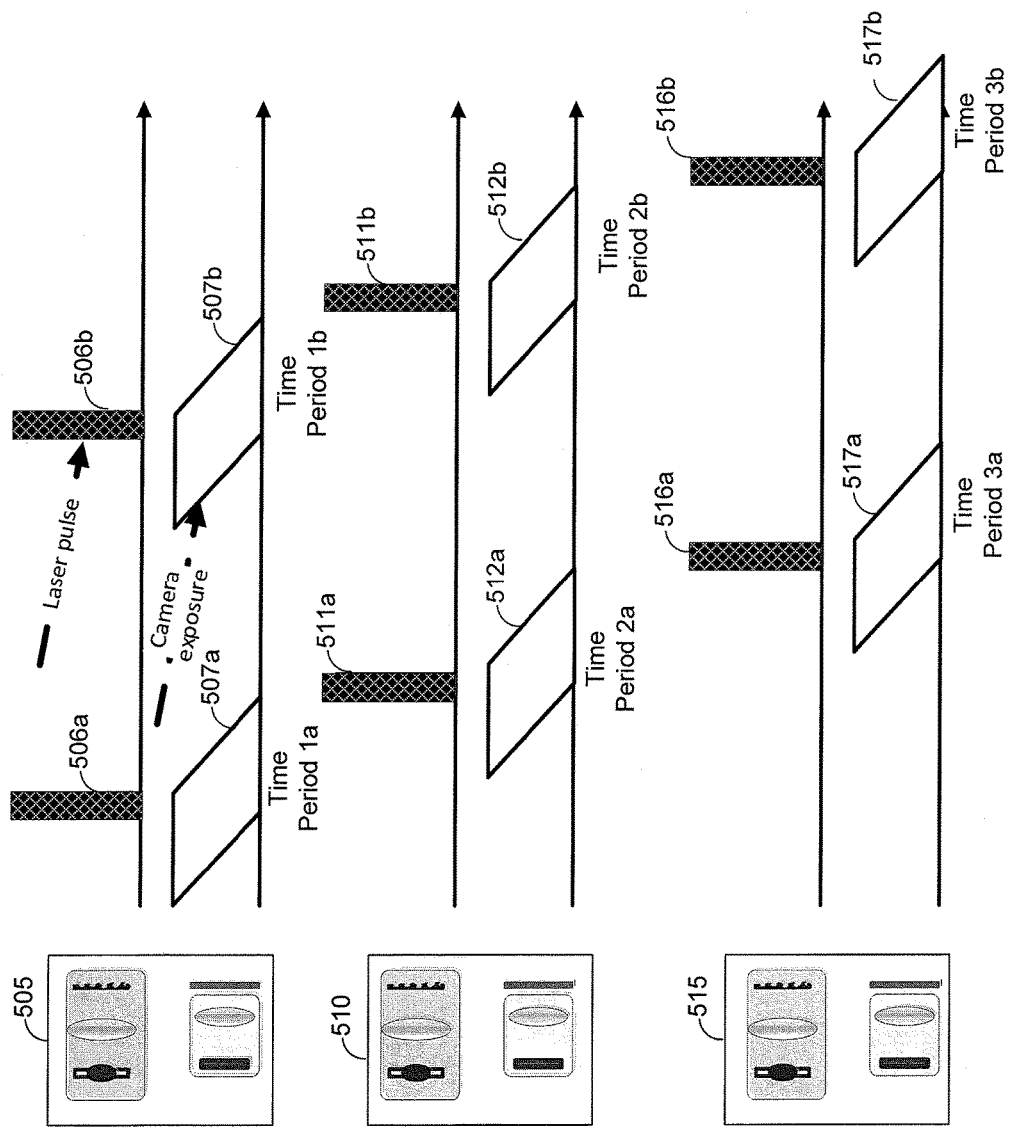
FIG. 5 illustrates an example of three light-source/camera imaging devices that are each configured to have a pulsed light output and a camera exposure window (duration of time), where one or more of the camera's do not have a global shutter (for example, a rolling shutter cameras) and the camera's may still be time switched, or controlled, (for example, with a lower frame rate).

FIG. 5 illustrates an example of three light-source/camera imaging devices (depth sensing devices) that are each configured to have a pulsed light output and a camera exposure window (duration of time), where the depth sensing devices have rolling shutters instead of global shutters (the pulsed light output may be referred to herein as an illumination pulse). In some embodiments where one or more of the depth sensing devices do not have a global shutter (for example, instead having a rolling shutter), the depth sensing devices may still be used in the same system and configured and operated to not interfere with each other. For example, in some embodiments the depth sensing cameras can be configured to adjust the time when they begin to emit one or more illumination pulses, and/or they can be configured to adjust the length of an illumination pulse, and/or they can be configured to adjust the illumination pulse frame rate. For example, in some embodiments, each of the depth sensing devices may control the time to be switched, or controlled, (for example, with a lower frame rate). In particular, depth sensing devices 505, 510, and 515 are each configured to have a pulsed light output (for example, 506$a$ and 506$b$, 511$a$ and 511$b$, and 516$a$ and 516$b$, respectively) and an exposure window (for example, 507$a$ and 507$b$, 512$a$ and 512$b$, and 517$a$ 517$b$, respectively).

Pulsed light outputs 506$a$, 511$a$ and 516$a$ of each depth sensing device 505, 510 and 515, respectively, occur at a different time than the other depth sensing devices. Because the depth sensing devices have rolling shutters that expose portions of the scene at a time (for example, a horizontal segment of the scene that corresponds to a row(s) of a sensor in the depth sensing system, for example sensor assembly 315 in FIG. 3) the exposure windows are different for different portions of the scene, as illustrated by the trapezoidal exposure windows. Referring to depth sensing device 505, similarly to the embodiment illustrated in FIG. 4 for global shutter embodiments, the laser pulse illuminates a scene or an object during a time period 1$a$ and the exposure window is also during time period 1$a$. As one having ordinary skill in the art will appreciate, because the rolling shutter only exposes a portion of the sensor at any one moment, the total duration of the exposure window will generally be longer, if all other conditions are equal. This may result in using a lower overall frame rate for a certain number of devices, or using less devices and maintaining a certain frame rate. However, the adjustment of the pulse length and the delay of emitting the pulse to illuminate the scene can be performed as described with reference to FIG. 4, and as described elsewhere herein.

Figure 6:
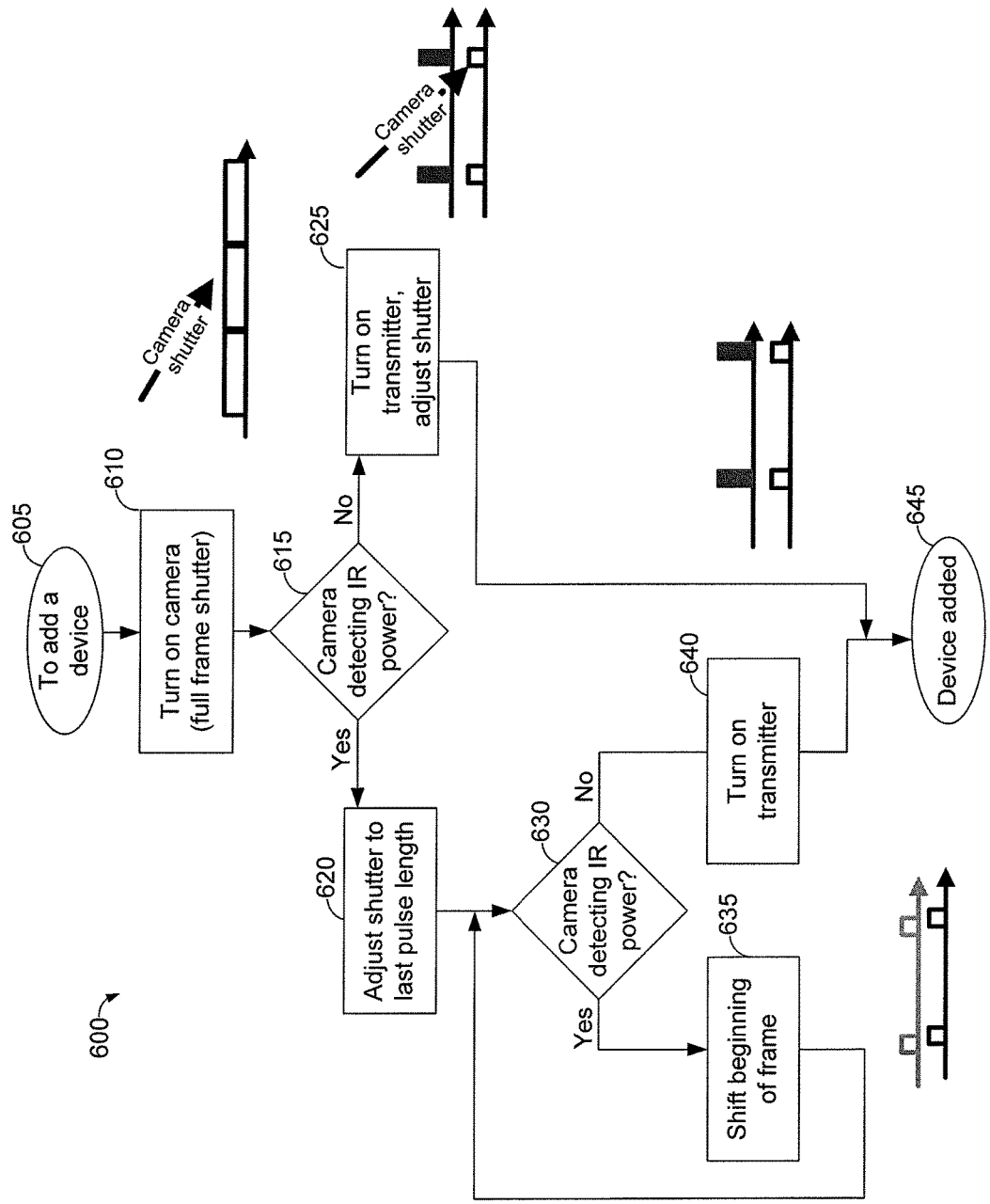
FIG. 6 is a process flow diagram for adding a depth sensing device to interact with at least one other depth sensing device in producing images for generating a 3D model of an object, and that can be performed by, for example, one or more of the devices disclosed herein.

FIG. 6 is a flow diagram illustrating an example of a process 600 for adding a depth sensing device to interact in conjunction with at least one other depth sensing device in an arrangement for producing images for generating a 3D model of a scene, for example, an object. Although this is discussed in the context of two or more depth sensing devices working in conjunction with each other so that they do not interfere with each other while operating to produce images containing depth information, the depth sensing devices do not need to communicate with each other, directly or indirectly, for this process to operate. Instead, each depth sensing device may be configured to adjust the time it emits an illumination pulse, adjust the length of an illumination pulse, and/or adjusts the frequency of emitting an illumination pulse. The process 600 can be performed by, for example, one or more of the devices disclosed herein. For example, it can be performed by one or more components of the depth sensing device 300 (FIG. 3). In some embodiments, processor 350 (which also may be referred to as a controller) may be configured with instructions that are stored in memory (for example, the working memory 305) to perform the add device process.

The process 600 starts at block 605 where a depth sensing device may be placed in an arrangement with one or more other depth sensing devices to collect images that include depth information of a scene. An example arrangement having four depth sensing devices is illustrated in FIG. 1. The process 600 may be performed on each of the depth sensing devices that are added into an arrangement of devices, and is described in the context of the device to be added. At block 610 the process 600 turns on a camera (or a sensor) of the depth sensing system and senses illumination of at least a portion of the scene. In some embodiments, the camera operates to sense radiation in the entire scene. For example, the camera is operated to sense radiation that is similar to radiation that will be used for that particular depth sensing device (e.g., IR, NIR, UV, or visible). Turn on device camera—full frame shutter.

At block 615 process 600 determines if the camera detected relevant radiation, in this example, NIR light, indicting the presence of another active depth sensing device in the arrangement. Process 600 is equally applicable to types of radiation other than NIR.

At block 625, if radiation is not detected, the process 600 turns on the transmitter and adjusts the shutter, for example to the pulse length. Process 600 then continues to block 645 which indicates that the device has been added. This exemplifies that a first depth sensing device added to an arrangement may not make any adjustments when it is first added, but it may make adjustments subsequently as additional depth sensing devices are added.

At block 620, if radiation is detected the camera shutter is adjusted to the laser pulse length. This may be done, for example, collectively by the capture control module 335 and the processor 350 illustrated in FIG. 3.

The process 600 then continues to block 630 where the camera again determines if potentially interfering radiation (for example, NIR) is present in the scene. If radiation is present in the scene, process 600 continues to block 635. If no potentially interfering radiation is detected, process 600 continue to block 640.

At block 635 the process shifts in time the beginning of the frame, that is, when it will be sending out its illumination pulse and its exposure window so it does not interfere with the radiation in the scene, indicative of another device in the process of illuminating the scene. The process 600 then continues back to block 630 where it again determines if the camera detects NIR power in the scene.

At block 640, having now detected there is no potentially interfering radiation in the scene, process 600 activates the transmitter 640 and illuminates the scene. At this point the device may continue to illuminate the scene at a certain frame rate and with a certain laser pulse length. The process may then proceed with another process where it illuminates the scene and senses depth information. In some embodiments where the frame rate may vary, the depth sensing device may sense the scene for potentially interfering radiation before it illuminates the scene. This may be done every time, or periodically, or in accordance with another sensing schedule.

At block 645 the process 600 for adding a device ends.

Figure 7:
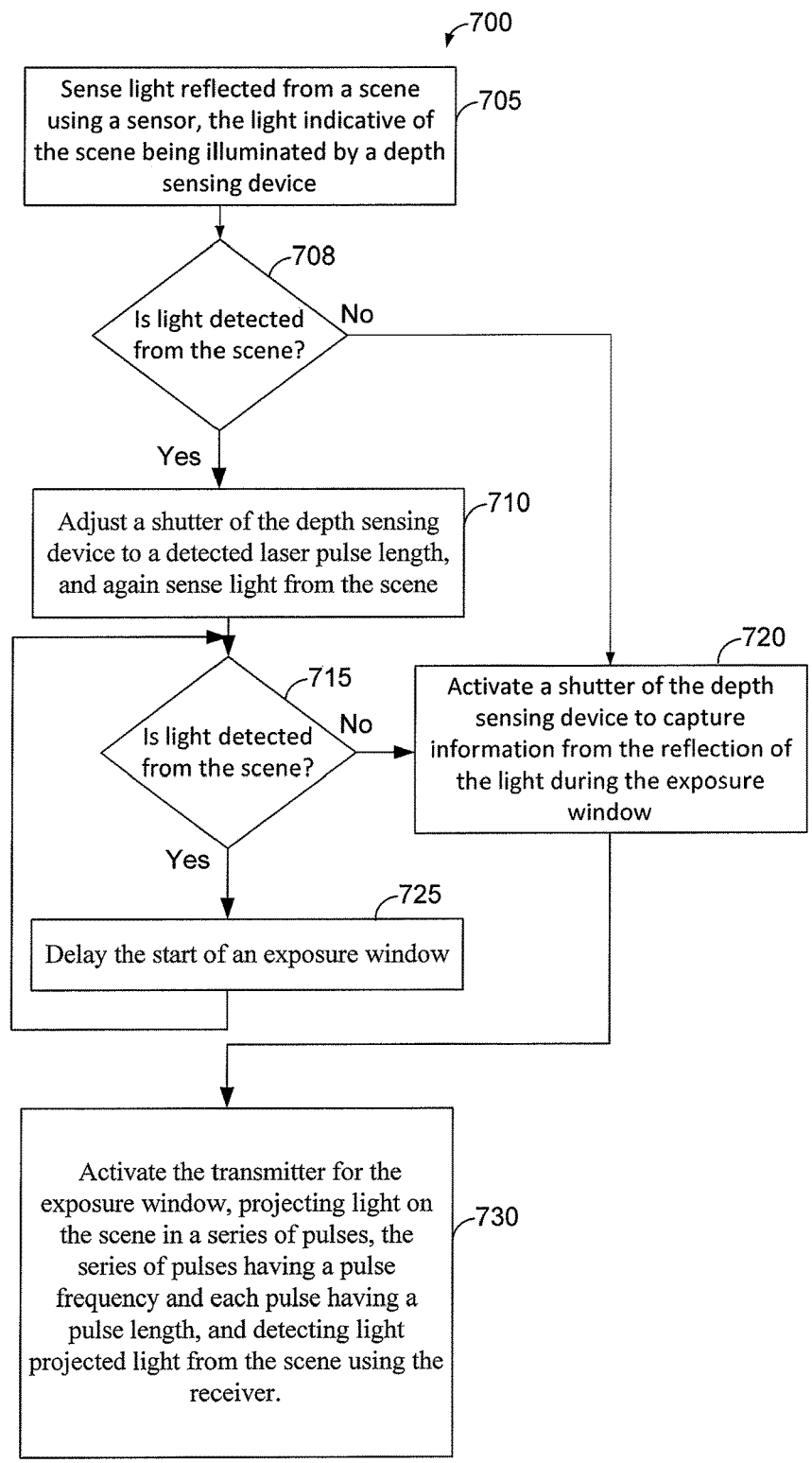
FIG. 7 is a process flow diagram illustrating a method for coordinating multiple depth sensing cameras that may be performed by one or more of the systems disclosed herein, or other systems.

FIG. 7 is a process flow diagram illustrating an example of a method 700 for coordinating multiple depth sensing cameras that may be performed by one or more of the systems disclosed herein, or other systems. The method 700 may be operative on a depth sensing device for capturing an image containing depth information of a scene in a depth sensing system that includes at least two depth sensing devices. In some embodiments, the device illustrated in FIG. 3 can perform the illustrated method.

At block 705, the method 700 senses light reflected from a scene using a sensor, the light indicative of the scene being illuminated by a depth sensing device. At decision block 708, the sensed light is evaluated to determine if light (indicative of another depth sensing device) was detected in the scene.

At block 710 if light from the scene is detected, the method 700 adjusts a shutter (for example, the time the shutter is open) of the depth sensing device to a detected laser pulse length, and again senses light from the scene and proceeds to block 715. This may have the effect of adjusting the shutter to a small enough period to avoid receiving light being projected from another device and allow both devices to work to form depth sensing maps within the same general timeframe, that is, without having one device operate first and then shut down completely and then have a second device operate.

At block 720 if light from the scene is not detected, the method 700 activates a shutter of the depth sensing device to capture information form the reflection of light during the exposure window and proceeds to block 730.

At block 715, the method 700 determines if light is detected from the scene. If now light is not detected, the method proceeds to block 720. If light is again detected, the method proceeds to block 725 where further adjustments may be made to the start of the exposure window and/or the time the shutter is open to capture light. Once a further adjustment is made (for example, to delay the start of the exposure window), the method proceeds from block 725 back to block 715 where it again determines if light is detected from the scene, the light being indicative of another depth sensing system operating and projecting light onto the scene. The method 700 iteratively repeats sensing if light is present on the scene and delays the start of an exposure window and/or may adjust the shutter window until light is not detected.

At block 730, the method 700 activates the transmitter and the receiver for the exposure window, projecting light on the scene in a series of pulses, the series of pulses having a pulse frequency and each pulse having a pulse length, and detecting light projected from the scene using the receiver. The transmitter of the depth sensing device projects light on the scene during an exposure window. This includes activating the shutter of the depth sensing device to capture information from the reflection of the light during the exposure window, the projected light including a series of pulses having a pulse length and a pulse frequency.

Implementing Systems and Terminology

Implementations disclosed herein provide systems, methods and apparatus for multiple aperture array cameras free from parallax and tilt artifacts. One skilled in the art will recognize that these embodiments may be implemented in hardware, software, firmware, or any combination thereof.

In some embodiments, the circuits, processes, and systems discussed above may be utilized in a wireless communication device. The wireless communication device may be a kind of electronic device used to wirelessly communicate with other electronic devices. Examples of wireless communication devices include cellular telephones, smart phones, Personal Digital Assistants (PDAs), e-readers, gaming systems, music players, netbooks, wireless modems, laptop computers, tablet devices, etc.

The wireless communication device may include one or more image sensors, two or more image signal processors, a memory including instructions or modules for carrying out the CNR process discussed above. The device may also have data, a processor loading instructions and/or data from memory, one or more communication interfaces, one or more input devices, one or more output devices such as a display device and a power source/interface. The wireless communication device may additionally include a transmitter and a receiver. The transmitter and receiver may be jointly referred to as a transceiver. The transceiver may be coupled to one or more antennas for transmitting and/or receiving wireless signals.

The wireless communication device may wirelessly connect to another electronic device (e.g., base station). A wireless communication device may alternatively be referred to as a mobile device, a mobile station, a subscriber station, a user equipment (UE), a remote station, an access terminal, a mobile terminal, a terminal, a user terminal, a subscriber unit, etc. Examples of wireless communication devices include laptop or desktop computers, cellular phones, smart phones, wireless modems, e-readers, tablet devices, gaming systems, etc. Wireless communication devices may operate in accordance with one or more industry standards such as the 3rd Generation Partnership Project (3GPP). Thus, the general term "wireless communication device" may include wireless communication devices described with varying nomenclatures according to industry standards (e.g., access terminal, user equipment (UE), remote terminal, etc.).

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It should be noted that the terms "couple," "coupling," "coupled" or other variations of the word couple as used herein may indicate either an indirect connection or a direct connection. For example, if a first component is "coupled" to a second component, the first component may be either indirectly connected to the second component or directly connected to the second component. As used herein, the term "plurality" denotes two or more. For example, a plurality of components indicates two or more components.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

In the foregoing description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

Headings are included herein for reference and to aid in locating various sections. These headings are not intended to limit the scope of the concepts described with respect thereto. Such concepts may have applicability throughout the entire specification.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. A depth sensing device for capturing depth information of a scene, wherein the depth sensing device and at least one other depth sensing device are part of an arrangement of depth sensing devices, the depth sensing device comprising:
 a memory; and
 a processor coupled to the memory, the processor configured to:
  operate to determine, using an image of the scene produced by a sensor of the depth sensing device, whether light from the at least one other depth sensing device is present in the scene without communicating with the at least one other depth sensing device;
  in response to determining that the light from the at least one other depth sensing device is not present in the scene, begin an exposure window of the depth sensing device during which a transmitter is activated to project light onto the scene and a receiver is activated to sense light reflected from the scene; and
  in response to determining that the light from the at least one other depth sensing device is present in the scene, delay the exposure window of the depth sensing device based at least in part on a width of light pulses emitted from the at least one other depth sensing device until the light from the at least one other depth sensing device is no longer detected in the scene, without communicating with the at least one other depth sensing device.

2. The depth sensing device of claim 1, wherein the transmitter is configured to project light onto the scene using a laser producing a near infrared (NIR) light beam.

3. The depth sensing device of claim 2, wherein the transmitter comprises a plurality of diffractive optical features.

4. The depth sensing device of claim 2, wherein the transmitter comprises a time-of-flight (TOF) transmitter.

5. The depth sensing device of claim 2, wherein the receiver comprises a shutter, and wherein execution of the instructions causes the transmitter to project a structured light pattern onto the scene.

6. The depth sensing device of claim 5, wherein the processor is further configured to delay the transmitter from producing the NIR light beam for a delay period based on a presence of NIR light indicative of the structured light pattern on the scene.

7. The depth sensing device of claim 2, wherein the receiver comprises a rolling shutter.

8. The depth sensing device of claim 2, wherein the laser produces a series of laser pulses at a pulse frequency, and wherein the processor is further configured to adjust the pulse frequency based on a presence of a structured light pattern in the scene.

9. A method for capturing depth information of a scene using a depth sensing device, wherein the depth sensing device and at least one other depth sensing device are part of an arrangement of depth sensing devices, the method comprising:
   determining, using an image of the scene produced by a sensor of the depth sensing device, whether light from the at least one other depth sensing device is present in the scene without communicating with the at least one other depth sensing device;
   in response to determining that the light from the at least one other depth sensing device is not present in the scene, beginning an exposure window of the depth sensing device during which a transmitter is activated to project light onto the scene and a receiver is activated to sense light reflected from the scene; and
   in response to determining that the light from the at least one other depth sensing device is present in the scene, delaying the exposure window of the depth sensing device based at least in part on a width of light pulses emitted from the at least one other depth sensing device until the light from the at least one other depth sensing device is no longer detected in the scene, without communicating with the at least one other depth sensing device.

10. The method of claim 9, wherein the light projected by the transmitter is a near infrared (NIR) light beam.

11. The method of claim 10, wherein the transmitter comprises a plurality of diffractive optical features.

12. The method of claim 9, wherein the transmitter comprises a time-of-flight (TOF) transmitter.

13. The method of claim 9, further comprising activating a rolling shutter during the exposure window.

14. The method of claim 9, further comprising adjusting a pulse frequency of the light projected by the transmitter based on detected light in the scene.

15. A depth sensing device for capturing depth information of a scene, wherein the depth sensing device and at least one other depth sensing device are part of an arrangement of depth sensing devices, the depth sensing device comprising:
   means for determining, using an image of the scene produced by a sensor of the depth sensing device, whether light from the at least one other depth sensing device is present in the scene without communicating with the at least one other depth sensing device;
   means for, in response to determining that the light from the at least one other depth sensing device is not present in the scene, beginning an exposure window of the depth sensing device during which a transmitter is activated to project light onto the scene and a receiver is activated to sense light reflected from the scene; and
   means for, in response to determining that the light from the at least one other depth sensing device is present in the scene, delaying the exposure window of the depth sensing device based at least in part on a width of light pulses emitted from the at least one other depth sensing device until the light from the at least one other depth sensing device is no longer detected in the scene, without communicating with the at least one other depth sensing device.

16. The depth sensing device of claim 15, further comprising:
   means for projecting a laser light beam onto the scene, the laser light beam including a series of laser pulses; and
   means for producing the image of the scene based on the reflected light.

17. The depth sensing device of claim 16, wherein the means for producing the image comprises a sensor assembly.

18. The depth sensing device of claim 16, further comprising:
   means for adjusting a pulse frequency of the laser light beam.

19. The depth sensing device of claim 15, wherein the means for beginning and the means for delaying comprises at least one processor.

20. The depth sensing device of claim 15, wherein the laser light beam is a near infrared (NIR) light beam.

21. The depth sensing device of claim 15, wherein the transmitter comprises a plurality of diffractive optical features.

22. The depth sensing device of claim 15, wherein the transmitter comprises a time-of-flight (TOF) transmitter.

23. The depth sensing device of claim 15, further comprising:
   means for activating the transmitter to project a structured light pattern onto the scene; and
   means for adjusting a shutter of the depth sensing device to be synchronized with a pulse length of the laser light beam based on an absence of the structured light pattern.

24. The depth sensing device of claim 23, further comprising:
   means for delaying the transmitter from producing the laser light beam for a delay period based on a presence of the structured light pattern on the scene.

25. The depth sensing device of claim 23, wherein the shutter comprises a rolling shutter.

26. A non-transitory computer readable medium containing instructions that, when executed by one or more processors of a depth sensing device, causes the depth sensing device to perform operations comprising:
   determining, using an image of the scene produced by a sensor of the depth sensing device, whether light from at least one other depth sensing device is present in the scene without communicating with the at least one other depth sensing device, wherein the depth sensing device and at least one other depth sensing device are part of an arrangement of depth sensing devices;

in response to determining that the light from the at least one other depth sensing device is not present in the scene, begin an exposure window of the depth sensing device during which a transmitter is activated to project light onto the scene and a receiver is activated to sense light reflected from the scene; and in response to determining that the light from the at least one other depth sensing device is present in the scene, delay the exposure window of the depth sensing device based at least in part on a width of light pulses emitted from the at least one other depth sensing device until the light from the at least one other depth sensing device is no longer detected in the scene, without communicating with the at least one other depth sensing device.

27. The non-transitory computer readable medium of claim 26, wherein execution of instructions causes the depth sensing device to perform operations further comprising:

projecting, from the transmitter, a near infrared (NIR) light beam, the projected NIR light beam representing a known structured light pattern; and detecting light reflected from the scene that is indicative of a structured light pattern.

\* \* \* \* \*